United States Patent
Ito et al.

(10) Patent No.: US 8,146,074 B2
(45) Date of Patent: Mar. 27, 2012

(54) COMPUTER-READABLE RECORDING MEDIUM CONTAINING APPLICATION MANAGEMENT PROGRAM, AND METHOD AND APPARATUS FOR APPLICATION MANAGEMENT

(75) Inventors: Yoshiyuki Ito, Kawasaki (JP); Soichi Nishiyama, Kawasaki (JP); Yasuhiko Awamoto, Yokohama (JP)

(73) Assignees: Fujitsu Limited, Kawasaki (JP); Fujitsu Broad Solution & Consulting, Inc., Tokyo (JP)

( * ) Notice: Subject to any disclaimer, the term of this patent is extended or adjusted under 35 U.S.C. 154(b) by 1219 days.

(21) Appl. No.: 11/711,963

(22) Filed: Feb. 28, 2007

(65) Prior Publication Data

US 2007/0244905 A1    Oct. 18, 2007

(30) Foreign Application Priority Data

Apr. 14, 2006 (JP) ................... 2006-111689

(51) Int. Cl.
   *G06F 9/44* (2006.01)
   *G06F 9/445* (2006.01)
(52) U.S. Cl. ............... 717/170; 717/177; 717/178
(58) Field of Classification Search ............. None
   See application file for complete search history.

(56) References Cited

U.S. PATENT DOCUMENTS

| | | | | |
|---|---|---|---|---|
| 6,918,113 | B2* | 7/2005 | Patel et al. ............... | 717/178 |
| 7,055,147 | B2* | 5/2006 | Iterum et al. .............. | 717/170 |
| 7,934,212 | B2* | 4/2011 | Lakhdhir .................. | 717/170 |
| 2002/0023258 | A1 | 2/2002 | Elwahab et al. | |
| 2002/0184499 | A1* | 12/2002 | Taguchi et al. ........... | 713/168 |
| 2003/0233649 | A1 | 12/2003 | Reimert | |
| 2005/0246347 | A1* | 11/2005 | Kobayashi ............... | 707/10 |
| 2006/0070019 | A1* | 3/2006 | Vishnumurty et al. ..... | 717/101 |
| 2009/0007098 | A1* | 1/2009 | Chevrette et al. ......... | 717/177 |

FOREIGN PATENT DOCUMENTS

EP    1 083 482 A3    3/2001

(Continued)

OTHER PUBLICATIONS

O'Sullivan et al., Agent technology and reconfigurable computing for mobile devices, Mar. 2005, pp. 963-969, <http://delivery.acm.org/10.1145/1070000/1066901/p963-osullivan.pdf>.*

Battiti et al., Nov. 2001, Cellular channel assignment: a new localized and distributed strategy, pp. 493-500, <http://delivery.acm.org/10.1145/510000/506893/p493-battiti.pdf>.*

(Continued)

*Primary Examiner* — Thuy Dao
(74) *Attorney, Agent, or Firm* — Greer, Burns & Crain, Ltd.

(57) ABSTRACT

A computer-readable recording medium containing an application management program for automatically performing version management to surely manage versions of a client application that communicates with a server application. A communication request monitor acquires a communication request issued from a terminal device to a server, and extracts version information of a client application from the communication request. An upgrade determination unit determines whether the extracted version information shows the latest version, and determines that upgrade is necessary if the version is not the latest version. A setting file transmitter sends the communication request to the server if the upgrade determination unit does not determine that the upgrade is necessary. If the upgrade is necessary, on the contrary, the setting file transmitter discards the communication request and sends the client application setting file for the latest version to the terminal device sending the communication request.

18 Claims, 12 Drawing Sheets

FOREIGN PATENT DOCUMENTS

| | | |
|---|---|---|
| EP | 1 178 402 A1 | 2/2002 |
| JP | 09-258967 | 10/1997 |
| JP | 11-095989 | 4/1999 |
| JP | 2006-309436 | 11/2006 |

OTHER PUBLICATIONS

UK Examination Report issued in App. No. GB0703697.3, dated Dec. 9, 2010.

* cited by examiner

120a

| VERSION INFORMATION TABLE | |
|---|---|
| ORDER | VERSION NUMBER |
| 2 | 2.0 |
| 1 | 1.5 |
| 0 | 1.4 |
| 0 | 1.3 |
| ... | ... |

| USER INFORMATION TABLE | | | | 130a |
|---|---|---|---|---|
| USER ID | USER NAME | GROUP NUMBER | VERSION NUMBER | |
| tanaka | TANAKA 〇〇 | 101 | 2.0 | |
| suzuki | SUZUKI △△ | 101 | 1.5 | |
| sato | SATO □□ | 102 | 1.5 | |
| takahashi | TAKAHASHI ×× | 102 | 1.4 | |
| ⋮ | ⋮ | ⋮ | ⋮ | |
| 131 | 132 | 133 | 134 | |

FIG. 7

| OPERATION INFORMATION TABLE | | | | 140a |
|---|---|---|---|---|
| GROUP NUMBER | GROUP NAME | VERSION NUMBER | SCHEDULED UPGRADE DATE | |
| 101 | 1st SALES DIVISION | 2.0 | 2006/04/01 | |
| 102 | 2nd SALES DIVISION | 2.0 | 2006/05/01 | |
| ⋮ | ⋮ | ⋮ | ⋮ | |
| 141 | 142 | 143 | 144 | |

FIG. 8

COMPUTER-READABLE RECORDING MEDIUM CONTAINING APPLICATION MANAGEMENT PROGRAM, AND METHOD AND APPARATUS FOR APPLICATION MANAGEMENT

CROSS-REFERENCE TO RELATED APPLICATIONS

This application is based upon and claims the benefits of priority from the prior Japanese Patent Application No. 2006-111689 filed on Apr. 14, 2006, the entire contents of which are incorporated herein by reference.

BACKGROUND OF THE INVENTION (1) Field of the Invention

This invention relates to a computer-readable recording medium containing an application management program, and a method and apparatus for application management, which enable managing the upgrade status of an application. More particularly, this invention relates to a computer-readable recording medium containing an application management program, and a method and apparatus for application management, which enable managing the upgrade status of a client application that communicates with a server application.

(2) Description of the Related Art

At present, client-server network applications have been widely used as a form of distributed processing that is performed by computers over networks. Especially, more forms are to distribute files via networks, which are required for execution of client applications. At first, a terminal device acquires a file that is required for execution of a client application from a previously designated computer. The terminal device then executes the client application based on the acquired file. The executed client application performs processing while communicating with a server application according to necessity. Such application forms have an advantage that a server is capable of collectively managing data. In addition, since a desired client application can be executed by using a terminal device, distributed processing using the functions and processing performance of the terminal device can be performed. For example, if the client application is executed by using a portable terminal device having a camera function, etc., processing involving these functions of the portable terminal device can be realized.

When a server application is upgraded to a new version, a client application should be upgraded to a new version accordingly. However, to upgrade the client application, a terminal device needs to actively acquire a file for the new version from a previously designated computer. This is because, in client-server applications, communication does not start unless the client application issues a communication request. Therefore, conventionally, an administrator notifies the user of the terminal device via another means such as e-mail that the file for the new version has become available. This method, however, has a drawback of a complicated process for managing the versions of the client application executed by terminal devices, which bears a large burden on the administrator.

There has been known a system for automatically managing versions of a client application (for example, refer to Japanese Unexamined Patent Publication No. 9-258967). In this system, a server computer holds information on the latest version of a client application and information of versions used by terminal devices. When a terminal device issues a version confirmation request to the server computer, the server computer determines based on locally stored information whether the version used by the requesting terminal device is the latest version. If the version is not the latest, the server computer automatically sends a file for the latest version to the terminal device. In addition, the server computer updates information of the version used by the terminal device, resulting in keeping the information stored on the server computer updated. Such a system significantly reduces a burden on an administrator who manages versions.

In Japanese Unexamined Patent Publication No. 9-258967, it is considered that upgrade of a client application is done in a terminal device when a file for the latest version is transmitted to the terminal device. Therefore, the version currently used by the terminal device cannot be managed.

That is, there are such cases that a user of the terminal device may not install a file obtained from the server computer in the terminal device or may remove the latest version file after installation. In these cases, the server computer cannot correctly track the version of the client application currently executed by the terminal device. As a result, communication from the client application to the server application of a different version is established and so a defect may occur while the server application is running.

SUMMARY OF THE INVENTION

This invention has been made in view of foregoing and intends to a computer-readable recording medium containing an application management program, and a method and apparatus for application management, which enable correctly managing the upgrade status of a client application that communicates with a server application.

To achieve the above object, there is provided a computer-readable recording medium containing an application management program for managing the upgrade status of a client application that communicates with a server application. The application management program contained in the computer-readable recording medium causes a computer to perform as: a setting file storage unit for storing a client application setting file containing information that is required for a terminal device to execute the client application; a version information storage unit for storing version information on the latest version of the client application setting file stored in the setting file storage unit; a communication request monitor for, when the terminal device executing the client application issues a communication request including version information of the client application to a server executing the server application over a network, acquiring the communication request on the network and extracting the version information of the client application from the communication request; an upgrade determination unit for consulting the version information storage unit to determine whether a version indicated by the version information extracted by the communication request monitor is the latest version, and determining that upgrade is necessary if the terminal device sending the communication request does not use the latest version; and a setting file transmitter for, if the upgrade determination unit does not determine that the upgrade is necessary, transmitting the communication request to the server, and if the upgrade determination unit determines that the upgrade is necessary, discarding the communication request and transmitting the client application setting file for the latest version stored in the setting file storage unit to the terminal device sending the communication request.

Further, to achieve the above object, there is provided an application management method for managing the upgrade status of a client application that communicates with a server application. In the application management method: a communication request monitor, when a terminal device executing the client application issues a communication request including version information of the client application to a server executing the server application over a network, acquires the communication request on the network and extracts the version information of the client application from the communication request; an upgrade determination unit consults a version information storage unit to determine whether a version indicated by the version information extracted by the communication request monitor is the latest version, and determines that upgrade is necessary if the terminal device sending the communication request does not use the latest version, the version information storage unit storing version information on the latest version of the client application; and a setting file transmitter, if the upgrade determination unit does not determine that the upgrade is necessary, transmits the communication request to the server, and if the upgrade determination unit determines that the upgrade is necessary, discards the communication request and obtains and transmits a client application setting file for the latest version from a setting file storage unit to the terminal device sending the communication request, the setting file storage unit storing the client application setting file containing information that is required for the terminal device to execute the client application.

Still further, to achieve the above object, there is provided an application management apparatus for managing the upgrade status of a client application that communicates a server application. The application management apparatus comprises: a setting file storage unit for storing a client application setting file containing information that is required for a terminal device to execute the client application; a version information storage unit for storing version information on the latest version of the client application setting file stored in the setting file storage unit; a communication request monitor for, when the terminal device executing the client application issues a communication request including version information of the client application to a server executing the server application over a network, acquiring the communication request on the network and extracting the version information of the client application from the communication request; an upgrade determination unit for consulting the version information storage unit to determine whether a version indicated by the version information extracted by the communication request monitor is the latest version, and determining that upgrade is necessary if the terminal device sending the communication request does not use the latest version; and a setting file transmitter for, if the upgrade determination unit does not determine that the upgrade is necessary, transmitting the communication request to the server, and if the upgrade determination unit determines that the upgrade is necessary, discarding the communication request and transmitting the client application setting file for the latest version stored in the setting file storage unit to the terminal device sending the communication request.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 6 shows an example data structure of a version information table.

FIG. 7 shows an example data structure of a user information table.

FIG. 8 shows an example data structure of an operation information table.

DESCRIPTION OF THE PREFERRED EMBODIMENTS

A preferred embodiment of this invention will be described with reference to the accompanying drawings. This invention will be first summarized and then the embodiment will be specifically described.

Figure 1:
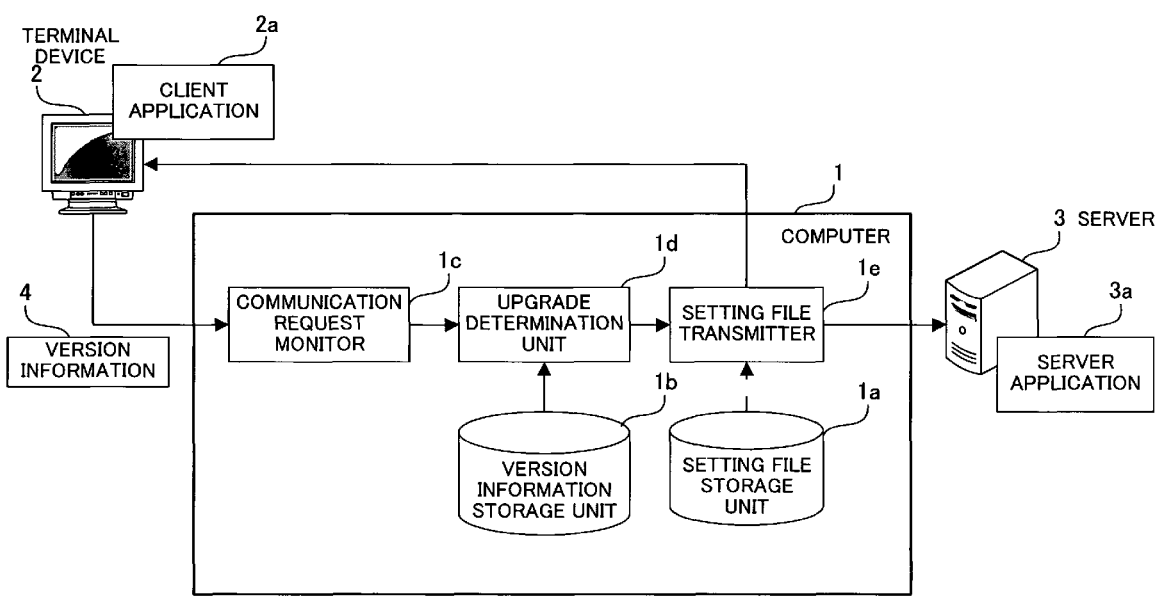
FIG. 1 is a conceptual view of the invention that is implemented in one embodiment.

FIG. 1 is a conceptual view of the invention that is implemented in this embodiment. A computer 1 exists on a communication path between a terminal device 2 that executes a client application 2a and a server 3 that executes a server application 3a, and is designed to monitor communication requests that the terminal device 2 issues to the server 3.

The computer 1 is provided with a setting file storage unit 1a, a version information storage unit 1b, a communication request monitor 1c, an upgrade determination unit 1d and a setting file transmitter 1e. The setting file storage unit 1a stores a client application setting file containing information that is required for the terminal device 2 to execute the client application 2a. The client application setting file may be a source file describing fragments of a program or a text file described in a markup language such as eXtensive Markup Language (XML). The version information storage unit 1b stores version information on the latest version of the client application setting file stored in the setting file storage unit 1a. As the version information, a version number such as "1.5" may be set, for example. In general, a version is newer as its version number is larger.

When the client application 2a requires communication with the server application 3a, the terminal device 2 executing the client application 2a first issues a communication request to the server 3 executing the server application 3a over a network. This communication request includes version information 4 of the client application 2a executed by the terminal device 2. This version information 4 is embedded into the header portion of the communication request, for example.

The communication request monitor 1c acquires the communication request issued from the terminal device 2 to the server 3 on the network, and extracts the version information 4 from the communication request. The upgrade determination unit 1d consults the version information storage unit 1b to determine whether a version indicated by the version information extracted by the communication request monitor 1c is the latest version. The upgrade determination unit 1d determines that upgrade is necessary if the client application 2a is not the latest version.

If the upgrade determination unit 1d does not determine that upgrade is necessary, the setting file transmitter 1e transmits the communication request to the server 3. That is to say, the communication request from the terminal device 2 to the server 3 is relayed by the computer 1. If the upgrade determination unit 1d determines that upgrade is necessary, on the contrary, the setting file transmitter 1e discards the communication request, and extracts and transmits a client application setting file for the latest version from the setting file storage unit 1a to the terminal device 2. The terminal device 2 upgrades the client application 2a to the latest version based on the received client application setting file.

In such a computer 1, the communication request monitor 1c extracts the version information 4 of the client application 2a from a communication request issued from the terminal device 2 to the server 3. Then the upgrade determination unit 1d determines whether the client application 2a executed by the terminal device 2 is the latest version, and determines that upgrade is necessary if the version is not the latest version. If it is not determined that the upgrade is necessary, the setting file transmitter 1e transmits the communication request to the server 3. If it is determined that the upgrade is necessary, on the contrary, the setting file transmitter 1e discards the communication request and transmits a client application setting file for the latest version to the terminal device 2.

As a result, the version of the client application currently executed by the terminal device can be correctly and easily managed. Therefore, the current version of the client application can be correctly recognized even if a user of the terminal device does not install the received latest version of client application setting file in the terminal device or if he/she removes the latest version of client application setting file after installation.

If the client application currently executed by the terminal device is not the latest version, a request for communication with the server application is rejected and the client application is automatically upgraded to the latest version. This can significantly reduce a burden of version management on the administrator and surely avoid a defect that is caused due to a conflict of versions between the client application and the server application.

Hereinafter, the embodiment of this invention will be described in detail with reference to the drawings.

Figure 2:
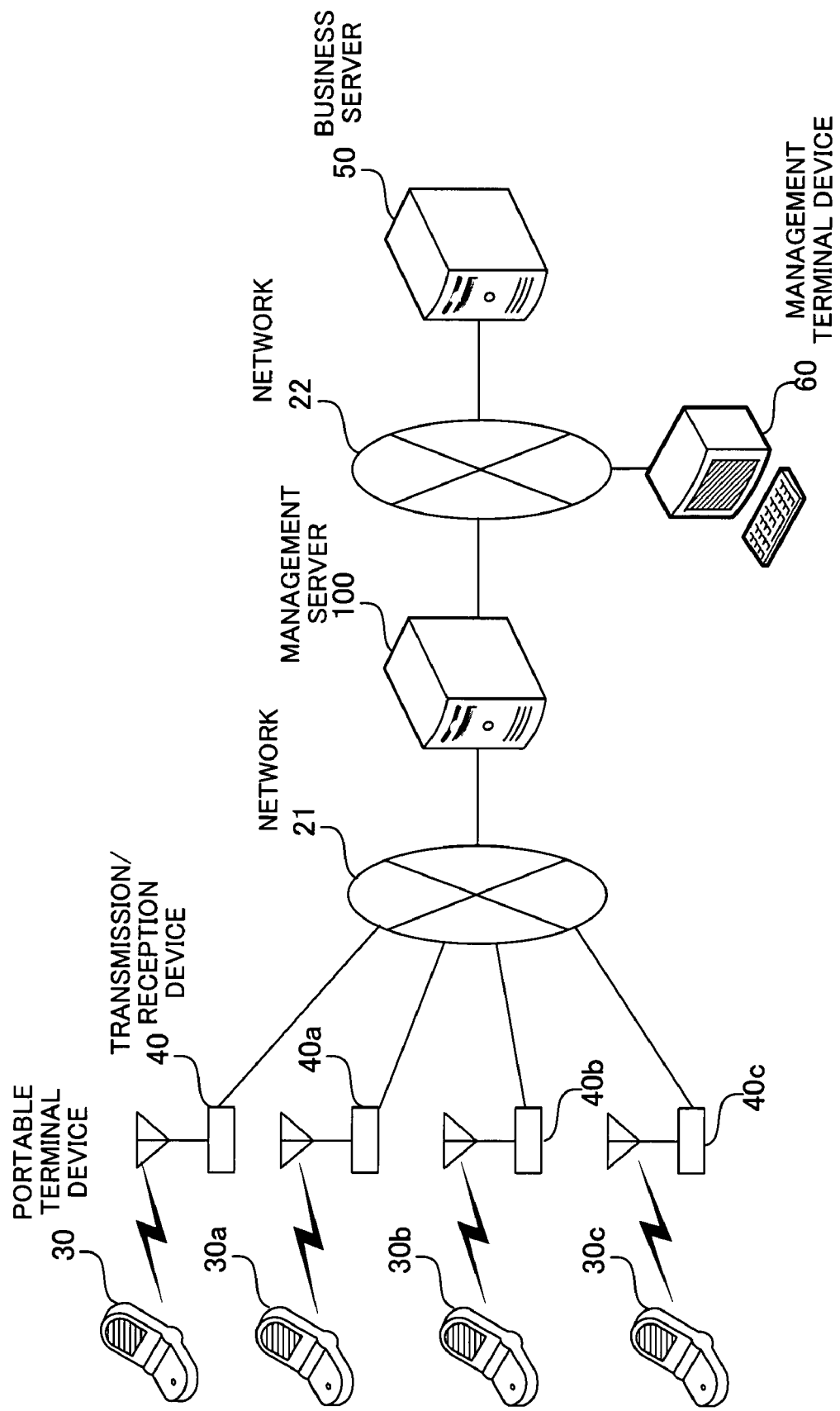
FIG. 2 shows a system configuration of this embodiment.

FIG. 2 shows a system configuration of this embodiment. The application management system of this embodiment is designed to manage the upgrade status of a client application executed by terminal devices, and to automatically upgrade the version when required.

The application management system of this embodiment has a management server 100, networks 21 and 22, portable terminal devices 30, 30a, 30b, and 30c, transmission/reception devices 40, 40a, 40b, and 40c, a business server 50, and a management terminal device 60. Each of the portable terminal devices 30, 30a, 30b, and 30c has a wireless communication function to enable wireless communication with a transmission/reception device 40, 40a, 40b, 40c while the transmission/reception device 40, 40a, 40b, 40c is within a communicable zone. The transmission/reception devices 40, 40a, 40b, and 40c are connected to the management server 100 via the network 21. That is, the portable terminal devices 30, 30a, 30b, and 30c are capable of communicating with the management server 100 via the transmission/reception devices 40, 40a, 40b, and 40c and the network 21. The management server 100 is connected to the business server 50 via the network 22. The management terminal device 60 is connected to the management server 100 and the business server 50 via the network 22.

The business server 50 executes a server application. An administrator uses the management terminal device 60 to install and run a program that is required for execution of the server application, in the business server 50. The management server 100 has a setting file that is required for executing a client application. The setting file is to be distributed to the portable terminal devices 30, 30a, 30b, and 30c. The administrator uses the management terminal device 60 to store the setting file on the management server 100.

To start to operate a new version of client application and a new version of server application, the administrator uses the management terminal device 60 to install a program for the new version of server application in the business server 50 and to store a setting file for the new version of client application on the management server 100. In order to upgrade a previous version to the new version smoothly, the administrator does not remove the previous version of server application executed by the business server 50 immediately.

Each of the portable terminal devices 30, 30a, 30b, and 30c is capable of executing the client application. The portable terminal devices 30, 30a, 30b, and 30c are portable telephones, personal digital assistants (PDAs), or compact note computers, which are capable of executing programs and are provided with a wireless communication function. A user of the portable terminal device 30, 30a, 30b, 30c previously acquires a client program for executing a client application from an administrator-designated computer based on description of a setting file. If the client program is stored on the management server 100, for example, the user previously acquires the client program from the management server 100.

The client application communicates with the server application executed by the business server 50 according to necessity. For example, the client application communicates with the server application to search data in the business server 50 for necessary data and displays the data on the portable terminal device 30, 30a, 30b, 30c.

When the client application starts to communicate with the server application, the portable terminal device 30, 30a, 30b, 30c transmits a communication request to the business server 50 by radio. The communication request is received by one of the transmission/reception devices 40, 40a, 40b and 40c. Then the transmission/reception device 40, 40a, 40b, 40c transfers the received communication request to the management server 100 via the network 21.

The management server 100 detects the version of the client application currently executed by the requesting portable terminal device based on the information included in the received communication request, to determine whether the client application should be upgraded. If upgrade is necessary, the management server 100 does not transfer the communication request to the business server 50 but sends a setting file required for executing the latest version of client application to the requesting portable terminal device. The portable terminal device 30, 30a, 30b, 30c upgrades the client application based on the received setting file and then issues a communication request to the business server 50 again.

If the upgrade is unnecessary, on the contrary, the management server 100 transfers the communication request to the business server 50 via the network 22. Since the communication request arrives at the business server 50, the client application starts to communicate with the server application.

The management server 100 manages the versions of the client application that is executed by the portable terminal devices 30, 30a, 30b, and 30c, detects previous versions that are useless any more for all of the portable terminal devices, as removable versions, and notifies the management terminal device 60 of the versions. The administrator controls the server application that is executed by the business server 50, based on the information of the removable versions displayed on the management terminal device 60.

Now, out of the management server 100, the business server 50 and the management terminal device 60, the hardware configuration of the management server 100 will be described by way of example. The other servers and terminal devices can have the same configuration.

Figure 3:
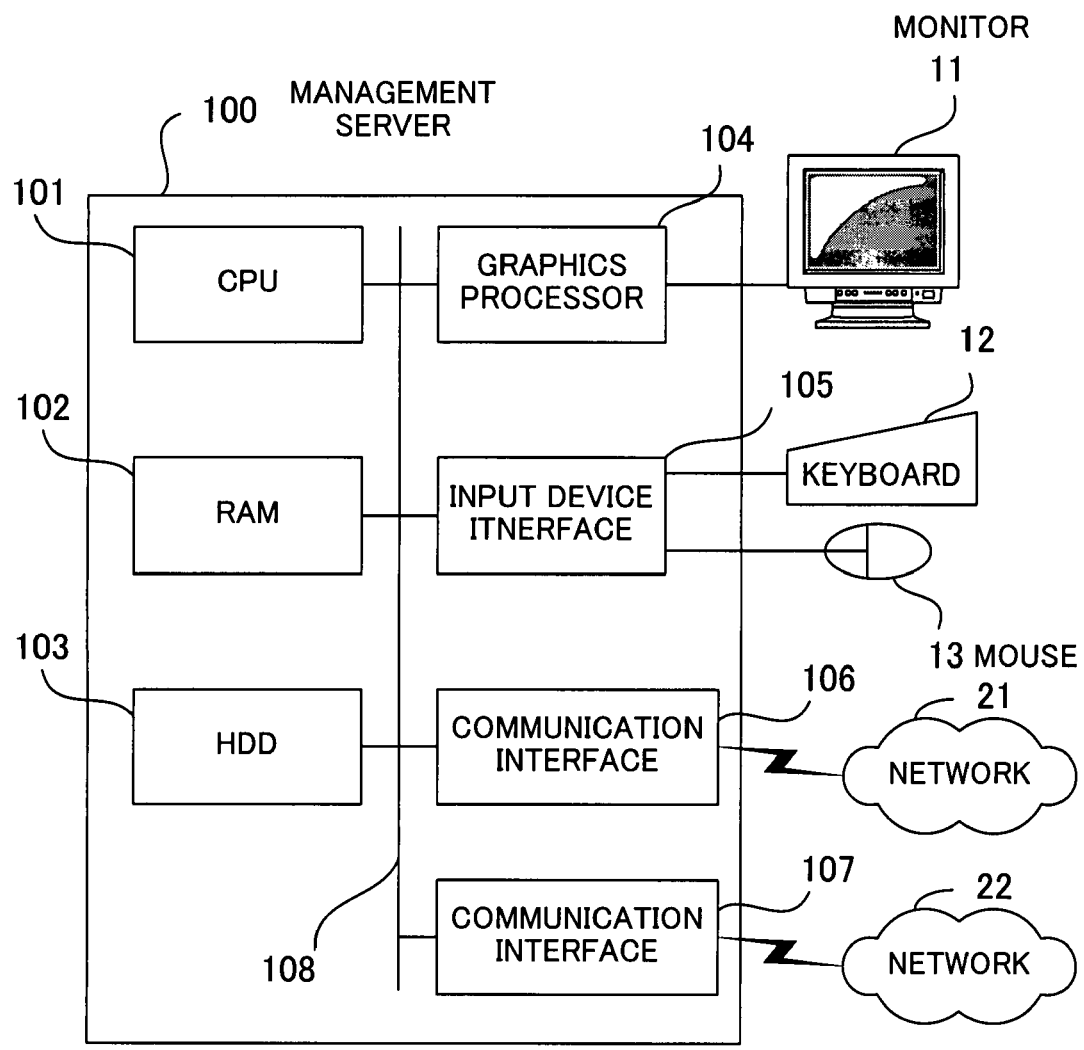
FIG. 3 shows a hardware configuration of a management server.

FIG. 3 shows a hardware configuration of the management server. The management server 100 is entirely controlled by a Central Processing Unit (CPU) 101. Connected to the CPU 101 via a bus 108 are a Random Access Memory (RAM) 102, a Hard Disk Drive (HDD) 103, a graphics processor 104, an input device interface 105, and communication interfaces 106 and 107.

The RAM 102 temporarily stores at least part of an Operating System (OS) program and application programs to be executed by the CPU 101. The RAM 102 also stores various data for CPU processing. The HDD 103 stores the OS program and the application programs.

The graphics processor 104 is connected to a monitor 11 to display images on the monitor 11 under the control of the CPU 101. The input device interface 105 is connected to a keyboard 12 and a mouse 13 and is designed to transfer signals from the keyboard 12 and the mouse 13 to the CPU 101 via the bus 108. The communication interfaces 106 and 107 are connected to networks 21 and 22, respectively.

Such a hardware configuration realizes the processing functions of this embodiment.

Now, out of the portable terminal devices 30, 30*a*, 30*b*, and 30*c*, the module configuration of the portable terminal device 30 will be described by way of example. The other portable terminal devices 30*a*, 30*b*, and 30*c* can have the same configuration.

Figure 4:
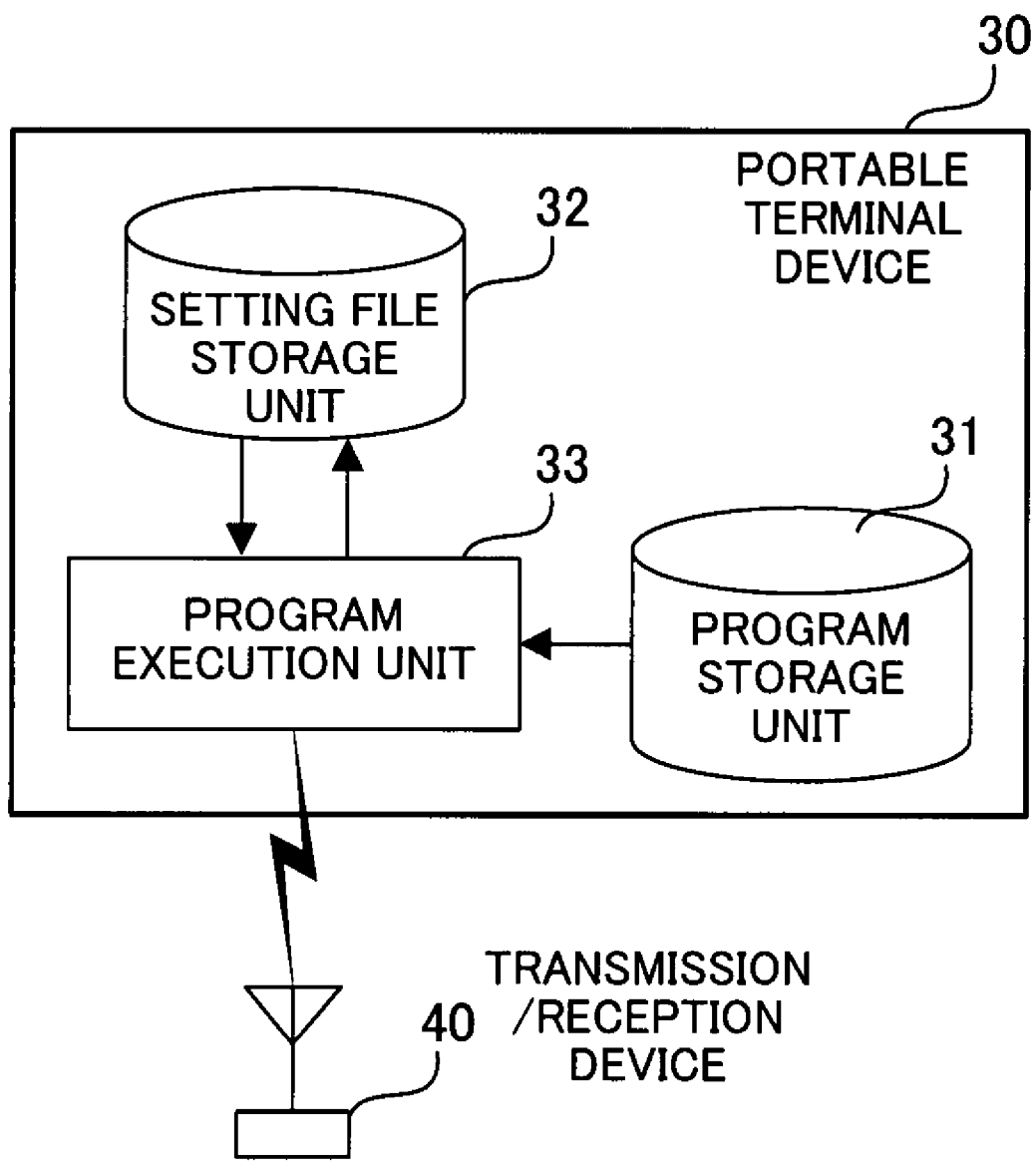
FIG. 4 is a functional block diagram of a portable terminal device.

FIG. 4 is a functional block diagram of the portable terminal device. The portable terminal device 30 has a program storage unit 31, a setting file storage unit 32 and a program execution unit 33. The program execution unit 33 is capable of communicating with the management server 100 via the transmission/reception device 40, 40*a*, 40*b*, 40*c* and the network 21.

The program storage unit 31 stores a client program that runs on the portable terminal device 30. The client program is a program that realizes the basic functions of the client application to be executed by the portable terminal device 30, that is to say, that realizes middleware functions. For example, the client program realizes a function to communicate with the management server 100 and a function to control screen display.

The setting file storage unit 32 stores a setting file describing setting information that is required for realizing the functions of the client application. By changing the description of the setting file, the client application realizes different functions. The setting file describes version information of the client application as well.

The program execution unit 33 starts to execute the client application according to user operation made on the portable terminal device 30. The program execution unit 33 first reads the client program from the program storage unit 31. The program execution unit 33 then reads the setting file from the setting file storage unit 32, and applies the setting information described in the setting file to the client program, resulting in realizing the client application. If the setting file is not stored in the setting file storage unit 32, the program execution unit 33 acquires the setting file from the management server 100 and stores it in the setting file storage unit 32.

When the client application requires communication with the server application, the program execution unit 33 sends a communication request to the business server 50. In the header portion of the communication request, a user ID of the user of the portable terminal device 30 and version information of the client application are embedded. The user ID is one that is entered by the user when the client application starts. The version information is one that is described in the setting file stored in the setting file storage unit 32.

When the program execution unit 33 acquires the setting file for a new version, this unit 33 stores the acquired setting file in the setting file storage unit 32, thereby upgrading the version of the client application.

In this connection, the portable terminal device 30 acquires a client program via a network and stores it in the program storage unit 31 in advance. For example, when the user starts to use the portable terminal device 30, the administrator shows information on a computer storing the client program to the user, and the user acquires the client program by using the portable terminal device 30. In principle, the client program may be acquired only once. To acquire a program from a computer, a generally-known function of portable telephones is used. In this embodiment, a method for acquiring a client program will not be described.

The module configuration of the management server 100 will be described.

Figure 5:
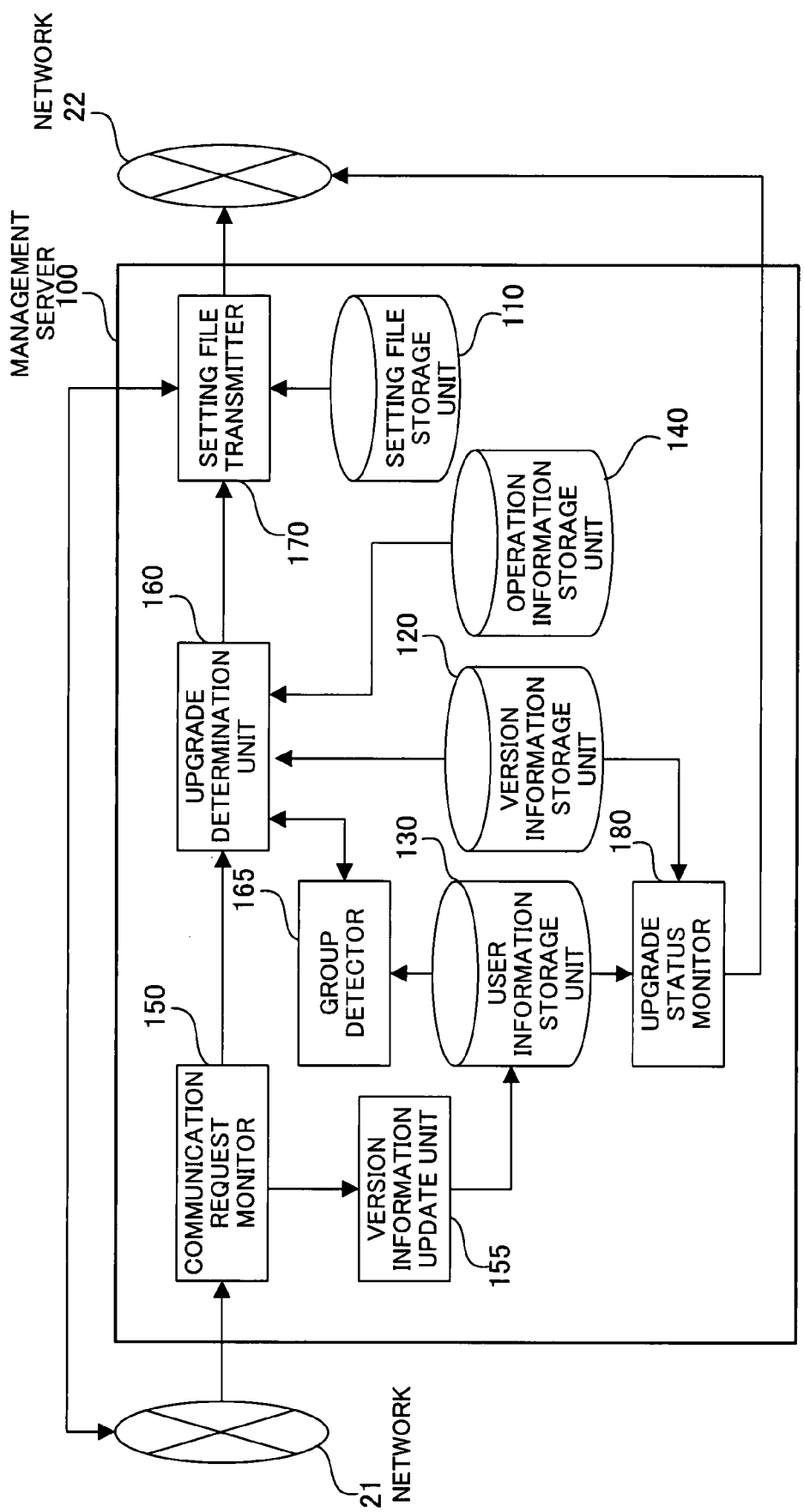
FIG. 5 is a functional block diagram of the management server.

FIG. 5 is a functional block diagram of the management server. The management server 100 has a setting file storage unit 110, a version information storage unit 120, a user information storage unit 130, an operation information storage unit 140, a communication request monitor 150, a version information update unit 155, an upgrade determination unit 160, a group detector 165, a setting file transmitter 170, and an upgrade status monitor 180. The communication request monitor 150 and the setting file transmitter 170 are capable of communicating with the portable terminal devices 30, 30*a*, 30*b*, and 30*c* via the network 21 and the transmission/reception devices 40, 40*a*, 40*b*, and 40*c*. The setting file transmitter 170 is capable of communicating with the business server 50 via the network 22. The upgrade status monitor 180 is capable of communicating with the management terminal device 60 via the network 22.

The setting file storage unit 110 stores a setting file describing setting information that is required for executing a client application. The setting information includes information on a method for displaying data and a method for communicating data with a server application, for example. In this connection, the setting file storage unit 110 sores only a setting file for the latest version. This is because this embodiment does not require distribution of setting files for previous versions. The setting file is stored by the administrator every time when the version is upgraded.

The version information storage unit 120 stores version information of the client application. The version information is represented as a version number such as "1.5". The version information storage unit 120 stores previous-version information, as well as the latest-version information. The version information is added by the administrator every time when the version is upgraded.

The user information storage unit 130 stores user information on the users of the portable terminal devices 30, 30*a*, 30*b*, and 30*c*. The user information includes information of an upgrade group that a user belongs to and version information of the client application used by the user. The information of the upgrade group is registered by the administrator in advance.

The upgrade group is created by classifying users, in order to specify an order of applying a new version. If the new version is applied to all users all at once and if the client application has a defect or an operational screen is difficult to intuitively understand, the administrator will be panicked by user inquiries. Therefore, the users are classified into some upgrade groups and upgrade of version is performed group by group stepwise.

The operation information storage unit 140 stores operation information for each upgrade group. The operation information includes information indicating whether the latest version is applicable to an upgrade group and information of a scheduled date of starting to apply the latest version. The operation information is updated by the administrator every time when the version is upgraded.

The communication request monitor 150 acquires a communication request sent from the program execution unit of the portable terminal device 30, 30a, 30b, and 30c to the business server 50. Then the communication request monitor 150 extracts the user ID and the version information from the header portion of the acquired communication request.

The version information update unit 155 updates user information stored in the user information storage unit 130 based on the user ID and the version information extracted by the communication request monitor 150. That is, the version information of the client application currently used by the user is reflected on the user information stored in the user information storage unit 130.

The upgrade determination unit 160 consults the version information storage unit 120 and the operation information storage unit 140 to determine whether the client application of the device requesting the communication request should be upgraded, based on the user ID and the version information extracted by the communication request monitor 150. A specific method for this determination will be described later.

The group detector 165 consults the user information storage unit 130 to detect the upgrade group of the user indicated by the user ID extracted by the communication request monitor 150.

The setting file transmitter 170 transfers the communication request acquired by the communication request monitor 150 to the business server 50 via the network 22 if the upgrade determination unit 160 determines that the upgrade of the client application is unnecessary. On the contrary, if it is determined that the upgrade of the client application is necessary, the setting file transmitter 170 discards the communication request acquired by the communication request monitor 150. Then the setting file transmitter 170 transmits a confirmation request for making a notice of the upgrade of the client application to the program execution unit of the portable terminal device requesting the communication request. When a confirmation response to the confirmation request arrives from the program execution unit, the setting file transmitter 170 obtains the setting file for the latest version from the setting file storage unit 110 and transmits it to the program execution unit.

The upgrade status monitor 180 always monitors the update status of the user information stored in the user information storage unit 130. When user information is updated, the upgrade status monitor 180 consults the version information storage unit 120 to detect versions that are useless for all users any more, out of previous versions, as removable versions. Then the upgrade status monitor 180 displays the removable versions on the management terminal device 60 via the network 22.

The version information storage unit 120 has a version information table 120a listing version information.

FIG. 6 shows an example data structure of the version information table. The version information table 120a contains a version number that is version information and information indicating newness of the version in association with each other in tabular form. The version information table 120a has a field 121 for an order of versions and a filed 122 for version number. Information arranged in a row over the fields is associated with each other.

In the field 121, a numerical value indicating an order of a version is set. A numerical value "2" means the latest version and a numerical value "1" means one-previous version. A numerical value "0" means two or more previous version. When new version information is added to the version information table 120a, an order of "2" is set for the new version. The orders "2" and "1" assigned until now are changed to "1" and "0", respectively.

In the field 122, a version number is set. In general, a larger version number means a newer version. Version numbers are represented in a format like "2.0". The numeral on the left side of comma is called major version. The major version starts with "1" and is increased one by one every time when the application is significantly modified. The numeral on the right side of comma is called minor version. The minor version starts with "0" and is increased one by one every time when the application is slightly modified.

For example, in a case where the latest version number is "2.0", information with an order of "2" and a version number of "2.0" is registered.

The user information storage unit 130 has a user information table 130a listing user information.

FIG. 7 shows an example data structure of the user information table. The user information table 130a contains user information for each user in tabular form. The user information table 130a has a field 131 for user ID, a field 132 for user name, a field 133 for group number and a field 134 for version number. Information arranged in a row over the fields is associated with each other to compose user information.

In the field 131, a user ID is set. A user ID is identification information identifying a user of the portable terminal device 30, 30a, 30b, 30c. A user ID is previously assigned to each user by the administrator. In the field 132, the user name of a users indicated by the user ID set in the field 131 are set.

In the field 133, the group number of an upgrade group that the user indicated by the user ID set in the field 131 belongs to is set. The group number is identification information identifying the upgrade group, and is assigned by the administrator in advance. In the field 134, the version number of the client application used by the user indicated by the user ID set in the field 131 is set.

Out of the user information stored in the user information table 130a, information other than the version number set in the field 134 is registered by the administrator in advance. For example, a user ID of "tanaka", a user name of "TANAKA OO", and a group number of "101" are registered in advance. The version number is appropriately updated by the version information update unit 155.

The operation information storage unit 140 has an operation information table 140a listing operation information.

FIG. 8 is an example data structure of the operation information table. The operation information table 140a contains operation information for each upgrade group in tabular form. The operation information table 140a has a field 141 for group number, a field 142 for group name, a field 143 for version number, and a field 144 for scheduled upgrade date. Information arranged in a row over the fields is associated with each other to compose operation information.

In the field 141, a group number identifying an upgrade group is set. In the field 142, the group name of an upgrade group indicated by the group number set in the field 141 is set. As a group name, a division name of an organization is used, for example.

In the field 143, the version number of a client application is set. In a case where this version number indicates the latest version, this means that the latest version is now applicable to the upgrade group indicated by the group number set in the field 141 or a scheduled date for allowing the latest version to become applicable is shown. In the field 144, a scheduled upgrade date for allowing the latest version to become applicable to the upgrade group indicated by the group number set in the field 141 is set.

Out of the operation information stored in the operation information table 140*a*, the group number set in the field 141 and the group name set in the field 142 are registered by the administrator in advance. For example, information with a group number of "101" and a group name of "first sales division" is registered in advance. In addition, the version number set in the field 143 and the scheduled upgrade date registered in the field 144 are appropriately updated by the administrator with taking the application status of the latest version into consideration.

Processes to be executed in a system having the above-described configuration and data structures will be described in detail. At first, an upgrade determination process to be performed when a portable terminal device 30, 30*a*, 30*b*, 30*c* sends a communication request to the business server 50 will be described.

Figure 9:
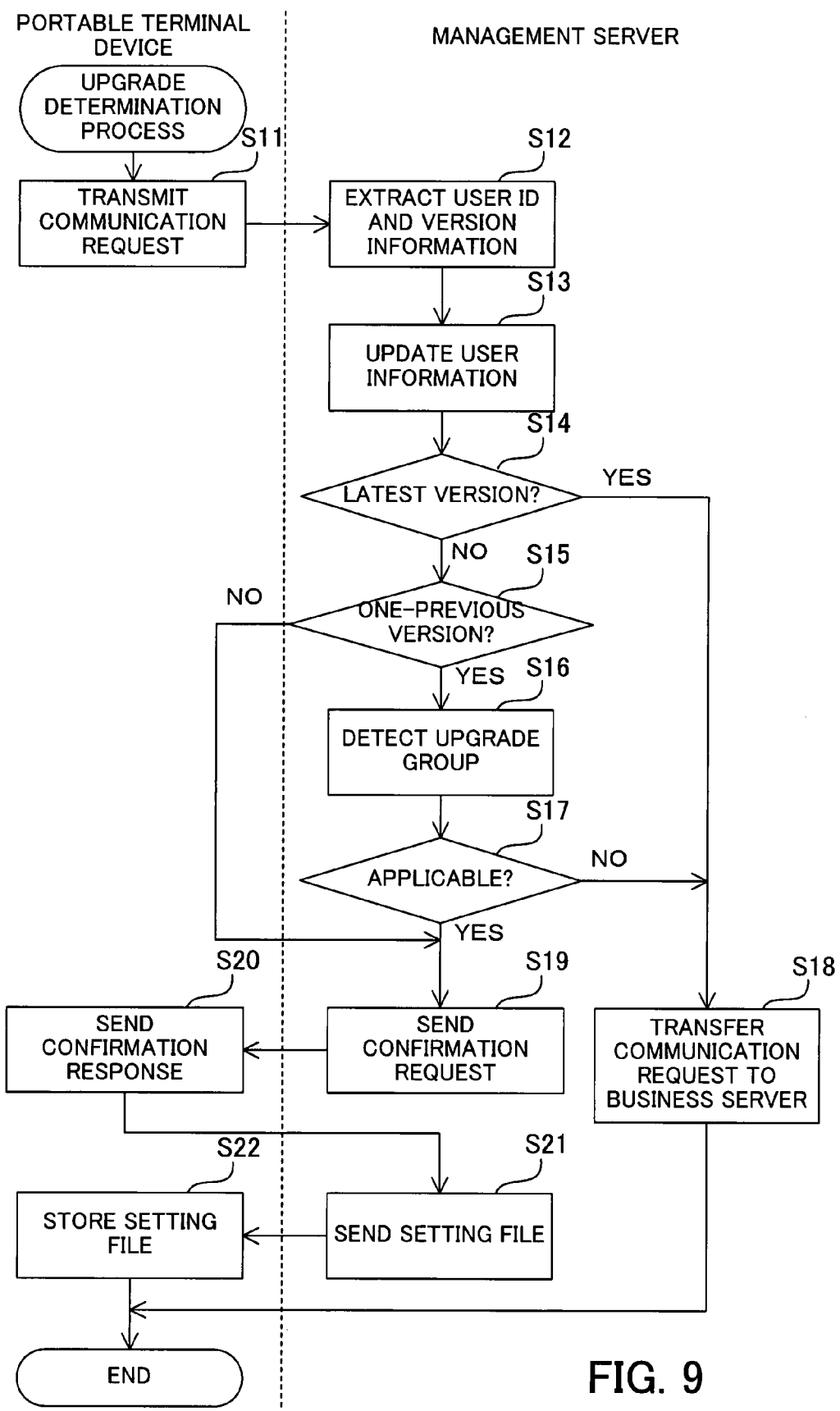
FIG. 9 is a flowchart showing a procedure of an upgrade determination process.

FIG. 9 is a flowchart showing a procedure of the upgrade determination process. This procedure of FIG. 9 will be described step by step. This example uses the portable terminal device 30 out of the portable terminal devices 30, 30*a*, 30*b*, and 30*c*. The same procedure can be applied for the other portable terminal devices.

[Step S11] The program execution unit 33 of the portable terminal device 30 transmits a communication request with a user ID and version information inserted into the header portion, to the business server 50 when communication with a server application is required.

[Step S12] The communication request monitor 150 of the management server 100 acquires the communication request issued from the portable terminal device 30 to the business server 50. Then the communication request monitor 150 extracts the user ID and the version information from the header portion of the acquired communication request.

[Step S13] The communication request monitor 150 notifies the version information update unit 155 of the user ID and the version information extracted in step S12. The version information update unit 155 searches the user information table 130*a* stored in the user information storage unit 130 for user information including the user ID received from the communication request monitor 150. The version information update unit 155 updates the version information of the detected user information to the version information received from the communication request monitor 150.

[Step S14] The communication request monitor 150 notifies the upgrade determination unit 160 of the user ID and the version information extracted in step S12. The upgrade determination unit 160 obtains the version number having an order of "2" (that is, the latest version) from the version information table 120*a* stored in the version information storage unit 120, and determines whether the detected version umber matches the version information received from the communication request monitor 150. If they match, the procedure goes on to step S18. Otherwise the procedure goes on to step S15.

[Step S15] The upgrade determination unit 160 searches the version information table 120*a* to determine whether the order of the version information received from the communication request monitor 150 in step S14 is "1" (that is, one-previous version). If yes, the procedure goes on to step S16. Otherwise the procedure goes on to step S19.

[Step S16] The upgrade determination unit 160 notifies the group detector 165 of the user ID received from the communication request monitor 150 in step S14. The group detector 165 searches the user information table 130*a* to detect the group number corresponding to the user ID received from the upgrade determination unit 160. Then the group detector 165 notifies the upgrade determination unit 160 of the detected group number.

[Step S17] The upgrade determination unit 160 searches the operation information table 140*a* stored in the operation information storage unit 140 to obtain the version number and scheduled upgrade date corresponding to the group number received from the group detector 165. Then the upgrade determination unit 160 determines whether the obtained version information is the version number of the latest version and whether the obtained scheduled upgrade date is a date before this upgrade determination process is performed. That is, it is determined whether the latest version is applicable to the upgrade group indicated by the group number received from the group detector 165. If yes, the procedure goes on to step S19. Otherwise the procedure goes on to step S18.

[Step S18] The upgrade determination unit 160 notifies the setting file transmitter 170 that upgrade of the client application is unnecessary. The setting file transmitter 170 receiving this notification transfers the communication request acquired by the communication request monitor 150 in step S12, to the business server 50.

[Step S19] The upgrade determination unit 160 notifies the setting file transmitter 170 that upgrade of the client application is necessary. The setting file transmitter 170 receiving this notification discards the communication request acquired by the communication request monitor 150 in step S12. Then the setting file transmitter 170 transmits a confirmation request for making a notice of necessity of the upgrade to the portable terminal device 30 sending the communication request.

[Step S20] The program execution unit 33 receives the confirmation request from the management server 100, and urges the user of the portable terminal device 30 to confirm that the upgrade of the client application is necessary. For example, the program execution unit 33 displays a confirmation window on a display screen. When the user makes a confirmation operation, the program execution unit 33 transmits a confirmation response to the management server 100.

[Step S21] The setting file transmitter 170 receives the confirmation response from the portable terminal device 30, obtains a setting file for the latest version from the setting file storage unit 110, and transmits it to the portable terminal device 30.

[Step S22] The program execution unit 33 receives the setting file from the management server 100, and stores the received setting file in the setting file storage unit 32. At this time, the program execution unit 33 may remove the setting file for the previous version. Then the program execution unit 33 re-starts the client application based on the setting file for the new version.

As described above, the program execution unit 33 of the portable terminal device 30 sends a communication request to the business server 50. The communication request monitor 150 of the management server 100 acquires the communication request addressed to the business server 50 and extracts the user ID and version information from the communication request. The version information update unit 155 reflects the extracted user ID and version information on the user information table 130*a*. The upgrade determination unit 160 determines whether upgrade of the client application is necessary, based on the extracted user ID and version information. If the upgrade is unnecessary, the setting file transmitter 170 transfers the communication request to the business server 50. If the upgrade is necessary, on the contrary, the setting file transmitter 170 discards the communication request, and transmits the setting file for the latest version under a condition that the portable terminal device 30 confirms this upgrade. The program execution unit 33 stores the received setting file in the setting file storage unit 32.

In a case where the device requesting the communication request uses the latest version, the upgrade determination unit 160 determines that the upgrade is unnecessary. Further, in a case where the latest version is not applicable to the upgrade group that the user belongs to, this upgrade determination unit 160 determines that the upgrade is unnecessary. In a case where the device requesting the communication request uses two or more previous version, the upgrade determination unit 160 determines that the upgrade is necessary. Furthermore, in a case where the device requesting the communication request uses one-previous version and the latest version is applicable to the upgrade group that the user belongs to, the upgrade determination unit 160 determines that the upgrade is necessary.

Assume now that four pieces of user information shown in FIG. 7 are registered in the user information table 130*a*. In this example, a user whose user ID is "tanaka" uses the portable terminal device 30, a user whose user ID is "suzuki" uses the portable terminal device 30*a*, a user whose user ID is "sato" uses the portable terminal device 30*b*, and a user whose user ID is "takahashi" uses the portable terminal device 30*c*.

As to the versions of the client application, it is assumed that the latest version number is "2.0" and one-previous version number is "1.5", as shown in FIG. 6. As to the scheduled upgrade date, the upgrade group of group number "101" has "Apr. 1, 2006" and the upgrade group of group number "102" has "May 1, 2006". In addition, the upgrade determination process is performed on Apr. 10, 2006.

In this situation, if the portable terminal device 30 issues a communication request, the upgrade determination unit 160 determines that upgrade is unnecessary because the requesting device uses the latest version of "2.0". If the portable terminal device 30*a* issues a communication request, the upgrade determination unit 160 confirms that the requesting device uses one-previous version of "1.5" and the latest version is applicable to the upgrade group (group number "101") that the user belongs to, and so determines that the upgrade is necessary. When the portable terminal device 30*b* issues a communication request, the upgrade determination unit 160 confirms that the requesting device uses one-previous version of "1.5" and the latest version is not yet applicable to the upgrade group (group number "102") that the user belongs to, and so determines that the upgrade is unnecessary. When the portable terminal device 30*c* issues a communication request, the upgrade determination unit 160 determines that the upgrade is necessary because the requesting device uses two or more previous version of "1.4".

In this embodiment, the setting file transmitter 170 is designed to send a confirmation request before sending a setting file to the portable terminal device 30, 30*a*, 30*b*, 30*c*. Alternatively, the setting file transmitter 170 may be designed to transmit the setting file without sending the confirmation request. In this case, the client application is automatically upgraded to the latest version, without user's confirmation.

In addition, in this embodiment, if a client application is a version two or more previous to the latest version, it is determined that the upgrade is necessary without taking into consideration the other criteria. Another criterion for automatically upgrading a version may be set. For example, "three or more" previous version may be set, instead of "two or more" previous version. In this case, an order for one and two previous versions may be set to "1" and an order for three and more previous versions may be set to "0" in the version information table 120*a*.

Next, a process that is performed by the upgrade status monitor 180 to monitor update of user information and detect removable versions will be described.

Figure 10:
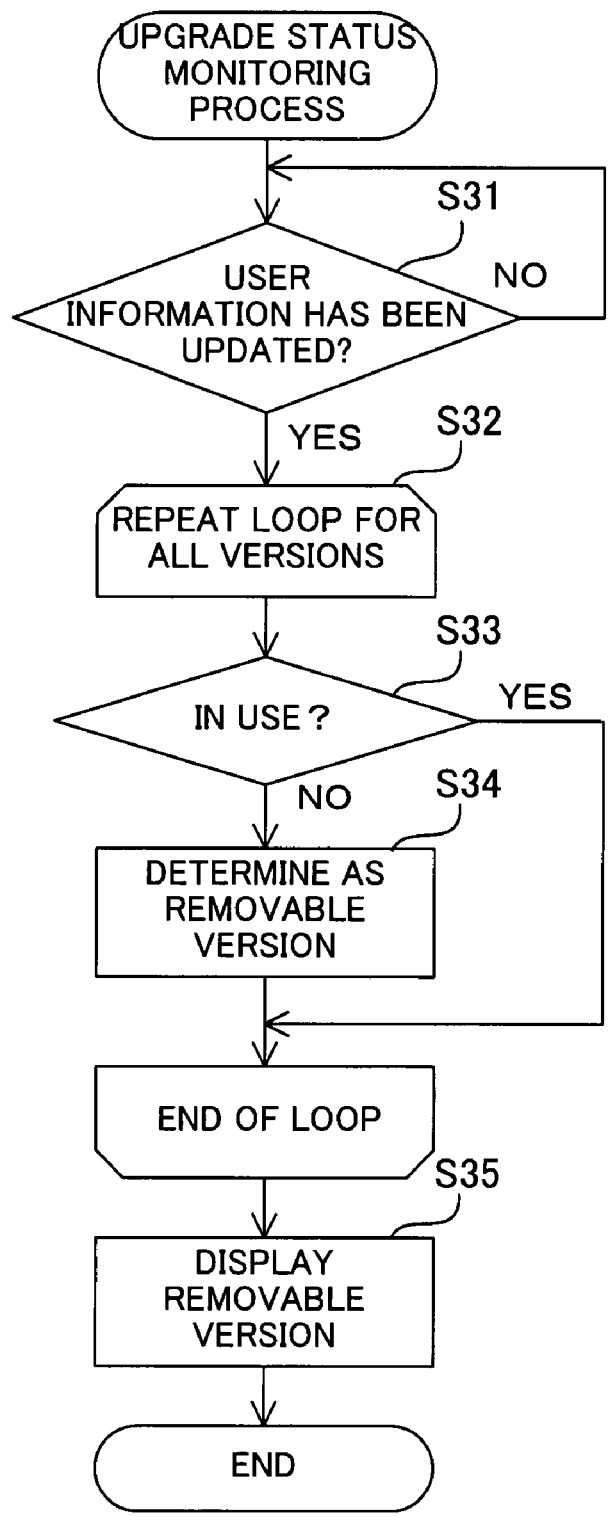
FIG. 10 is a flowchart showing a procedure of an upgrade status monitoring process.

FIG. 10 is a flowchart showing a procedure of the upgrade status monitoring process. This procedure will be described step by step.

[Step S31] The upgrade status monitor 180 always watches the user information table 130*a* stored in the user information storage unit 130 to detect updated user information. When updated user information is detected, the procedure goes on to step S32. Otherwise the upgrade status monitor 180 waits user information to be updated in this step S31.

[Step S32] The upgrade status monitor 180 searches the version information table 120*a* stored in the version information storage unit 120 for the version numbers of all versions other than a version of an order "2" (that is, the latest version). Then the upgrade status monitor 180 repeats a loop of step S33 and step S34 for each obtained version number.

[Step S33] The upgrade status monitor 180 searches the user information table 130*a* to determine whether user information having the version number selected in step S32 exists. That is, it is determined whether there is a user who uses the client application of the version number selected in step S32. If yes, this loop is completed for this version number. If no, the procedure goes on to step S34.

[Step S34] The upgrade status monitor 180 specifies the version of the version number selected in step S32 as a removable version.

[Step S35] The upgrade status monitor 180 sends the management terminal device 60 the version numbers of the versions specified as removable versions out of the version numbers obtained in step S32, to display them.

As described above, when user information is updated in the user information table 130*a*, the upgrade status monitor 180 displays versions that all users do not use, on the management terminal device 60. This allows the administrator to know the removable versions. Then the administrator can remove the server applications corresponding to the client application of the removable versions without doubt. This is because the client applications that communicate with the server applications do not exist any more.

An example application of this embodiment will be now described. In this example, a client program to be executed by a portable terminal device is acquired from a distribution server provided by a telecommunication corporation.

Figure 11:
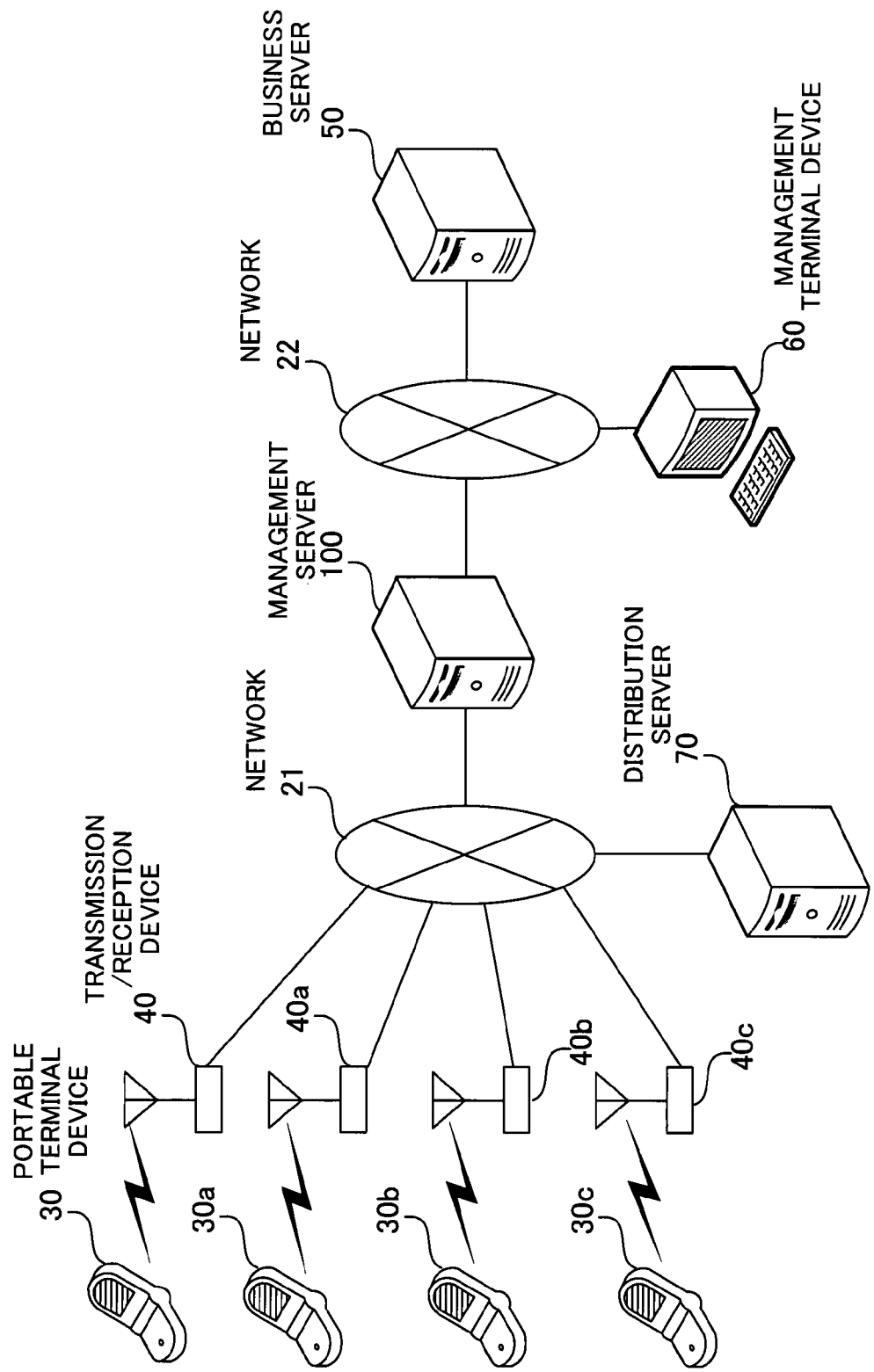
FIG. 11 shows a system configuration of an example application of this embodiment.

FIG. 11 shows a system configuration of the example application of this embodiment. This system configuration has a distribution server 70, in addition to the system configuration of FIG. 2. The distribution server 70 is a computer of the telecommunication corporation providing the network 21, and is connected to the network 21. The administrator requests the telecommunication corporation to store a client program to be executed by the portable terminal devices 30, 30a, 30b, and 30c on the distribution server 70.

Figure 12:
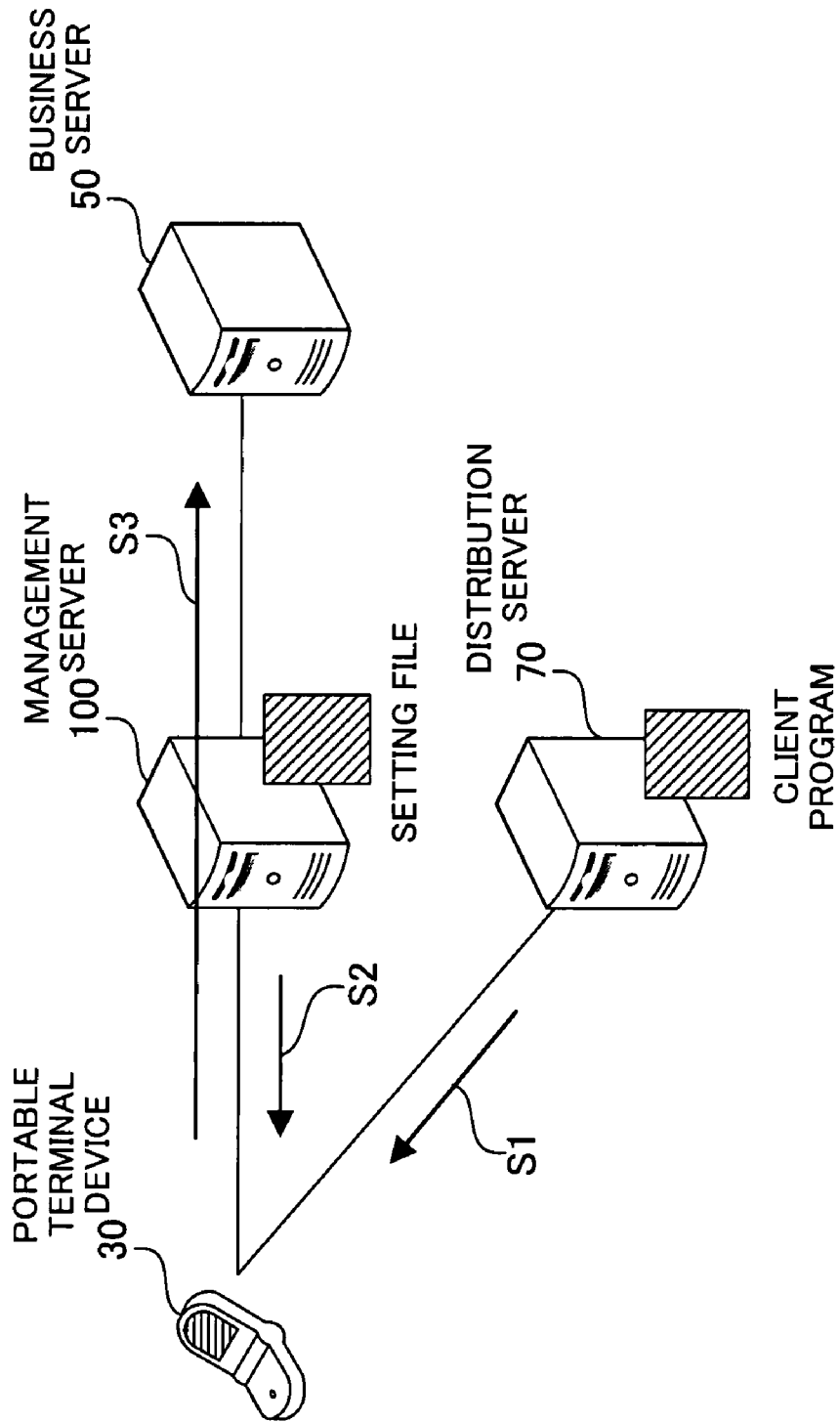
FIG. 12 shows a processing flow of the example application of this embodiment.

FIG. 12 shows a processing flow of the example application of this embodiment. This flow of FIG. 12 will be described step by step. It is assumed that a user uses the portable terminal device 30.

[Step S1] When the user executes a client application with the portable terminal device 30 for the first time, he/she acquires the client program from the distribution server 70 by operating the portable terminal device 30. For example, if a Uniform Resource Locator (URL) is disclosed as information indicating a location of the client program, for example, the user acquires the client program from the location indicated by the URL.

[Step S2] The client program acquires a setting file for the latest version from the management server 100 when it starts to run for the first time. The client program then executes the client application based on the obtained setting file.

[Step S3] The client program sends a communication request to the business server 50 when the executed client application requires communication with the server application. Then the management server 100 executes the processes described in this embodiment.

As described above, since a file required for realizing a client application is divided into a client program and a setting file, these two files can be stored on different servers. By storing the client program on the distribution server of the telecommunication corporation, the client program can be easily distributed by using existing wireless communication networks. In addition, by storing the setting file on the management server of an organization, the setting file can be desirably upgraded without requesting the telecommunication corporation's help.

Since the management server 100 for executing an application management program is used, the versions of a client application executed by portable terminal devices can be correctly recognized. This can surely prevent a defect that is caused due to mismatch of versions between the client application and the server application. If upgrade of the client application is necessary, the upgrade is automatically performed, resulting in significantly reducing a burden of version management of the client application.

In addition, since users are classified into a plurality of upgrade groups and the latest version is applied to the upgrade groups group by group stepwise, stepwise shifting of version from a previous version to the latest version can be done. This can minimize effects of a defect occurring in the new version on business. In addition, versions that all users do not use any more can be detected, which can significantly reduce a burden of version management of the server application.

It should be noted that fixed terminal devices may be used as terminal devices that execute client applications, instead of the portable terminal devices used in this embodiment. This case can also produce the same effects in that version management of a client application can be surely and easily performed.

The processing functions described above can be realized by a general computer. In this case, a program is prepared, which describes processes for the functions to be performed by the management server 100. The program is executed by a computer, whereupon the aforementioned processing functions are accomplished by the computer. The program describing the required processes may be recorded on a computer-readable recording medium. Computer-readable recording media include magnetic recording devices, optical discs, magneto-optical recording media, semiconductor memories, etc. The magnetic recording devices include Hard Disk Drives (HDD), Flexible Disks (FD), magnetic tapes, etc. The optical discs include Digital Versatile Discs (DVD), DVD-Random Access Memories (DVD-RAM), Compact Disc Read-Only Memories (CD-ROM), CD-R (Recordable)/RW (ReWritable), etc. The magneto-optical recording media include Magneto-Optical disks (MO) etc.

To distribute the program, portable recording media, such as DVDs and CD-ROMs, on which the program is recorded may be put on sale. Alternatively, the program may be stored in the storage device of a server computer and may be transferred from the server computer to other computers through a network.

A computer which is to execute the program stores in its storage device the program recorded on a portable recording medium or transferred from the server computer, for example. Then, the computer runs the program. The computer may run the program directly from the portable recording medium. Also, while receiving the program being transferred from the server computer, the computer may sequentially run this program.

With this invention, a communication request issued from a client application to a server application is monitored, so as to know the version of the client application. This enables surely and easily managing the version of the client application currently executed. Therefore, even if a user of a terminal device does not install a client application setting file for the latest version in the terminal device or if the user removes the setting file after installation, a defect that is caused due to mismatch of versions between the client application and the server application can be prevented for sure.

The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An application management method, executed by a computer including a central processing unit (CPU), for managing an upgrade status of a client application communicating with a server application, the application management method comprising:
receiving through a network a communication request whose source is a terminal device executing the client application and whose destination is a server executing the server application, the communication request including version information of the client application, the computer existing on a communication path between the terminal device and the server;
extracting the version information from the received communication request;
consulting version information storage means to determine whether a version indicated by the extracted version information is a latest version, and determining that upgrade of the client application is necessary if the terminal device does not use the latest version, the version information storage means storing latest-version information on the latest version of the client application;
transferring, if determining that the upgrade is not necessary, the received communication request to the server through the network; and
discarding, if determining that the upgrade is necessary, the received communication request and transmitting a client application setting file for the latest version stored in setting file storage means to the terminal device through the network instead of transferring the received communication request to the server, the client application setting file containing information required for the terminal device to execute the client application.

2. The application management method according to claim 1, wherein, if determining that the upgrade is necessary, the computer transmits an upgrade confirmation message to the terminal device, and when receiving a confirmation response to the upgrade confirmation message from the terminal device, transmits the client application setting file to the terminal device.

3. The application management method according to claim 1, wherein:
the computer extracts user identification information and the version information from the communication request when acquiring the communication request including the user identification information and the version information, the user identification information identifying a user using the terminal device;
the computer consults user information storage means to detect an upgrade group that the user indicated by the extracted user identification information belongs to, the user information storage means storing the user identification information and information of the upgrade group that the user indicated by the user identification information belongs to, in association with each other; and
the computer consults the version information storage means to determine whether the version indicated by the extracted version information is the latest version, and consults operation information storage means to determine whether the latest version is applicable to the detected upgrade group, and determines that the upgrade is necessary if the terminal device sending the communication request does not use the latest version and the latest version is applicable, the operation information storage means storing information indicating whether the latest version of the client application is applicable, for each upgrade group.

4. The application management method according to claim 3, wherein the computer consults the operation information storage means and determines that the latest version is applicable to the terminal device sending the communication request if a scheduled upgrade date for the detected upgrade group has come, the operation information storage means storing information of the scheduled upgrade date of starting to apply the latest version of the client application, for each upgrade group.

5. The application management method according to claim 3, wherein the computer consults the version information storage means and determines that the upgrade is necessary, irrespective of whether the latest version is applicable to the detected upgrade group, if the version indicated by the extracted version information is a version that is preset version or more previous to the latest version, the version information storage means further storing previous-version information on previous versions of the client application.

6. The application management method according to claim 1, wherein:
the computer extracts user identification information and the version information from the communication request when acquiring the communication request including the user identification information and the version information, the user identification information identifying a user using the terminal device; and the application management method further comprising:
updating corresponding version information to the extracted user identification information, to the extracted version information, the corresponding version information stored in user information storage means that further stores the user identification information and the version information of the client application in association with each other, the client application executed by the terminal device used by the user identified by the user identification information; and
consulting the version information storage means to detect a useless previous version that all users identified by the user identification information stored in the user information storage means do not use, as a removable version, and notifying a management terminal device of the computer of the removable version, the version information storage means further storing previous-version information on previous versions of the client application.

7. A non-transitory computer-readable recording medium containing an application management program for managing an upgrade status of a client application communicating with a server application, the application management program causing a computer to perform a method comprising:
receiving through a network a communication request whose source is a terminal device executing the client application and whose destination is a server executing the server application, the communication request including version information of the client application, the computer existing on a communication path between the terminal device and the server;
extracting the version information from the received communication request;
consulting version information storage means to determine whether a version indicated by the extracted version information is a latest version, and determining that upgrade of the client application is necessary if the terminal device does not use the latest version, the version information storage means storing latest-version information on the latest version of the client application; and
transferring, if determining that the upgrade is not necessary, the received communication request to the server through the network; and
discarding, if determining that the upgrade is necessary, the received communication request and transmitting a client application setting file for the latest version stored in setting file storage means to the terminal device through the network instead of transferring the received communication request to the server, the client application setting file containing information required for the terminal device to execute the client application.

8. The non-transitory computer-readable recording medium containing the application management program according to claim 7, wherein, if determining that the upgrade is necessary, the computer transmits an upgrade confirmation message to the terminal device, and when receiving a confirmation response to the upgrade confirmation message from the terminal device, transmits the client application setting file to the terminal device.

9. The non-transitory computer-readable recording medium containing the application management program according to claim 7, wherein:
the computer extracts user identification information and the version information from the communication request when acquiring the communication request including the user identification information and the version information, the user identification information identifying a user using the terminal device;

the application management program further causes the computer to perform a method of:

consulting user information storage means to detect an upgrade group that the user indicated by the extracted user identification information belongs to, the user information storage means storing the user identification information and information of the upgrade group that the user indicated by the user identification information belongs to, in association with each other; and the computer consults the version information storage means to determine whether the version indicated by the extracted version information is the latest version, and consults operation information storage means to determine whether the latest version is applicable to the detected upgrade group, and determines that the upgrade is necessary if the terminal device sending the communication request does not use the latest version and the latest version is applicable, the operation information storage means storing information indicating whether the latest version of the client application is applicable, for each upgrade group.

10. The non-transitory computer-readable recording medium containing the application management program according to claim 9, wherein:

the operation information storage means stores information of a scheduled upgrade date of starting to apply the latest version of the client application, for each upgrade group; and the computer determines that the latest version is applicable to the terminal device sending the communication request if the scheduled upgrade date for the detected upgrade group has come.

11. The non-transitory computer-readable recording medium containing the application management program according to claim 9, wherein:

the version information storage means further stores previous-version information on previous versions of the client application; and the computer determines that the upgrade is necessary, irrespective of whether the latest version is applicable to the detected upgrade group, if the version indicated by the extracted version information is a version that is preset version or more previous to the latest version.

12. The non-transitory computer-readable recording medium containing the application management program according to claim 7, wherein:

the version information storage means further stores previous-version information on previous versions of the client application;

the computer extracts user identification information and the version information from the communication request when acquiring the communication request including the user identification information and the version information, the user identification information identifying a user using the terminal device; and the application management program further causes the computer to perform a method comprising:

updating corresponding version information to the extracted user identification information, to the extracted version information, the corresponding version information stored in user information storage means that stores the user identification information and the version information of the client application in association with each other, the client application executed by the terminal device used by the user identified by the user identification information; and consulting the version information storage means to detect a useless previous version that all users identified by the user identification information stored in the user information storage means do not use, as a removable version, and notifying a management terminal device of the computer of the removable version.

13. An application management apparatus for managing an upgrade status of a client application communicating a server application, the application management apparatus comprises:

a memory device to store a client application setting file containing information required for a terminal device to execute the client application, and to store latest-version information on a latest version of the client application setting file;

a communication request monitor unit configured to receive through a network a communication request whose source is a terminal device executing the client application and whose destination is a server executing the server application, the communication request including version information of the client application, and to extract the version information from the received communication request, the application management apparatus existing on a communication path between the terminal device and the server;

an upgrade determination unit configured to consult the memory device to determine whether a version indicated by the extracted version information is the latest version, and to determine that upgrade of the client application is necessary if the terminal device does not use the latest version; and a setting file transmission unit configured to, if the upgrade determination unit determines that the upgrade is not necessary, transmit the received communication request to the server through the network, and if the upgrade determination unit determines that the upgrade is necessary, to discard the received communication request and to transmit the client application setting file for the latest version stored in the memory device to the terminal device through the network instead of transferring the received communication request to the server.

14. The application management apparatus according to claim 13, wherein, if the upgrade determination unit determines that the upgrade is necessary, the setting file transmission unit transmits an upgrade confirmation message to the terminal device, and when receiving a confirmation response to the upgrade confirmation message from the terminal device, transmits the client application setting file to the terminal device.

15. The application management apparatus according to claim 13, wherein:

the communication request monitor unit extracts user identification information and the version information from the communication request when acquiring the communication request including the user identification information and the version information, the user identification information identifying a user using the terminal device;

the memory device further stores the user identification information and information of an upgrade group that the user indicated by the user identification information belongs to, in association with each other, and stores information indicating whether the latest version of the client application is applicable, for each upgrade group;

the application management apparatus further comprises a group detection unit configured to consult the memory device to detect the upgrade group that the user indicated by the user identification information extracted by the communication request monitor unit belongs to; and the upgrade determination unit consults the memory device to determine whether the version indicated by the version information extracted by the communication request monitor unit is the latest version, and consults the memory device to determine whether the latest version is applicable to the upgrade group detected by the group detection unit, and determines that the upgrade is necessary if the terminal device sending the communication request does not use the latest version and the latest version is applicable.

16. The application management apparatus according to claim 15, wherein:

the memory device stores information of a scheduled upgrade date of starting to apply the latest version of the client application, for each upgrade group; and the upgrade determination unit determines that the latest version is applicable to the terminal device sending the communication request if the scheduled upgrade date for the upgrade group detected by the group detection unit has come.

17. The application management apparatus according to claim 15, wherein:

the memory device further stores previous-version information on previous versions of the client application; and the upgrade determination unit determines that the upgrade is necessary, irrespective of whether the latest version is applicable to the upgrade group detected by the group detection unit, if the version indicated by the version information extracted by the communication request monitor unit is a version that is preset version or more previous to the latest version.

18. The application management apparatus according to claim 13, wherein:

the memory device further stores previous-version information on previous versions of the client application;

the communication request monitor unit extracts user identification information and the version information from the communication request when acquiring the communication request including the user identification information and the version information, the user identification information identifying a user using the terminal device;

the memory device further stores the user identification information and the version information of the client application in association with each other, the client application executed by the terminal device used by the user identified by the user identification information; and the application management apparatus further comprises:

a version information update unit configured to update corresponding version information to the user identification information extracted by the communication request monitor unit, to the version information extracted by the communication request monitor unit, the corresponding version information stored in the memory device; and an upgrade status monitor unit configured to consult the memory device to detect a useless previous version that all users identified by the user identification information stored in the storage do not use, as a removable version, and to notify a management terminal device of the computer of the removable version.

* * * * *

UNITED STATES PATENT AND TRADEMARK OFFICE
CERTIFICATE OF CORRECTION

PATENT NO. : 8,146,074 B2  Page 1 of 1
APPLICATION NO. : 11/711963
DATED : March 27, 2012
INVENTOR(S) : Ito et al.

It is certified that error appears in the above-identified patent and that said Letters Patent is hereby corrected as shown below:

In the Claims

Col. 18, line 41    After "application;" delete "and".
Claim 7

Signed and Sealed this
Seventeenth Day of July, 2012

David J. Kappos
*Director of the United States Patent and Trademark Office*